(No Model.)
J. M. LEARNED.
FILTER.
No. 295,926. Patented Apr. 1, 1884.
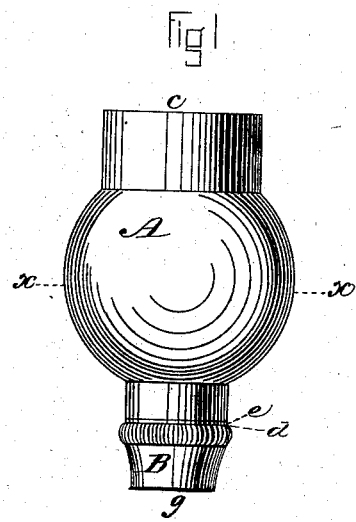
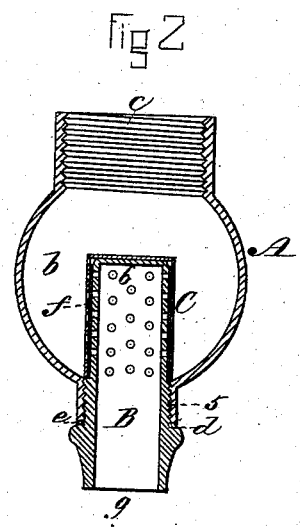
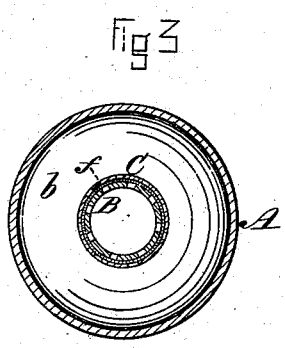
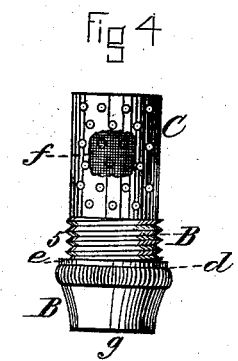
WITNESSES
W. J. Cambridge
Chas. E. Griffin
INVENTOR
James M. Learned
per H. E. Teschemacher
Atty

UNITED STATES PATENT OFFICE.

JAMES M. LEARNED, OF BOSTON, ASSIGNOR TO DEXTER F. BENNETT, OF SOMERVILLE, MASSACHUSETTS.

FILTER.

SPECIFICATION forming part of Letters Patent No. 295,926, dated April 1, 1884.

Application filed June 26, 1883. (No model.)

*To all whom it may concern:*

Be it known that I, JAMES M. LEARNED, a citizen of the United States, residing at Boston, in the county of Suffolk and State of Massachusetts, have invented certain Improvements in Filters, of which the following is a full, clear, and exact description, reference being had to the accompanying drawings, making part of this specification, in which—

Figure 1 is a side elevation of a filter constructed in accordance with my invention. Fig. 2 is a vertical section through the center of the same. Fig. 3 is a horizontal section on the line $x\ x$ of Fig. 1. Fig. 4 is a side elevation of the central perforated discharge-tube detached from the outer casing, a portion of its cap or outer perforated sleeve being broken away to show the wire-gauze beneath.

My invention has for its object to provide a cheap, simple, and durable filter, in which the wire-gauze which forms the filtering medium is securely confined in place in such a manner that it is protected from wear, and consequently not liable to become broken or injured by long usage or the careless handling of the filter; and my invention consists in the combination, with a shell or outer casing adapted to be screwed onto a faucet, of a perforated discharge or outlet tube closed at its inner end and extending up centrally within the shell, the outlet-tube being surrounded by a piece of wire-gauze, which is securely confined in place and protected from wear by a removable perforated cap or sleeve fitting tightly thereover.

In the said drawings, A represents the shell or outer casing of the filter, which is provided at its center with a spherical chamber, $b$, at the upper end of which is the inlet-aperture $c$, provided with a screw-thread to adapt the filter to be screwed to the end of an ordinary faucet having a corresponding thread.

Into the lower end of the casing A is screwed the outlet or discharge tube B, which is provided, just below its screw-thread 5, with a shoulder, $d$, between which and the end of the casing is placed a leather washer, $e$, to render the joint tight. The tube B is closed tightly at its inner end, 6, and that portion between the end 6 and the screw-thread 5 is perforated on all sides, as seen in Figs. 2 and 3, this perforated portion having wrapped around it a piece of fine wire-gauze, $f$, which forms the filtering medium, and which is confined securely in place by a cap or outer sleeve, C, which is also perforated on all sides except the top, and fits so tightly over the wire-gauze on the tube B as to be held thereon by friction. When, however, it is desired to cleanse the filter, the cap C can be readily drawn off by the hand, after which the wire-gauze $f$ can be removed from around the tube B, and after cleaning the parts can be easily and quickly replaced.

It will be seen that the tube B, with its cap C, extends up centrally within the chamber $b$ nearly to the inlet-aperture $c$, and directly in line therewith, and consequently receives the full force of the water which strikes directly upon the top of the cap C, and is thereby broken and diffused within the chamber $b$, passing through the wire-gauze $f$ in a direction at right angles to that in which it entered the chamber $b$, and consequently the force with which it impinges on the filtering-medium is considerably lessened. The water, after passing through the perforated cap C, wire-gauze $f$, and the perforations of the tube B, is discharged from the open lower end, $g$, thereof in a clean, purified state.

What I claim as my invention, and desire to secure by Letters Patent, is—

In a filter, the combination, with the shell or casing A, having a chamber, $b$, of the perforated discharge-tube B, closed at its inner end, and extending up centrally within the casing in line with the inlet-aperture thereof, and surrounded by a piece of wire-gauze, $f$, secured in place by a perforated cap or sleeve, C, fitting thereover, all constructed and arranged to operate substantially in the manner and for the purpose described.

Witness my hand this 23d day of June, A. D. 1883.

JAMES M. LEARNED.

In presence of—
P. E. TESCHEMACHER,
W. J. CAMBRIDGE.